United States Patent [19]
Stoddard

[11] 3,862,261

[45] Jan. 21, 1975

[54] MELAMINE RESIN-POLYOL-POLYURETHANE COATING COMPOSITION AND ARTICLE COATED THEREWITH

[75] Inventor: Darrell D. Stoddard, Malibu, Calif.

[73] Assignee: Ophthalmic Sciences, Inc., Santa Monica, Calif.

[22] Filed: Oct. 3, 1973

[21] Appl. No.: 402,953

[52] U.S. Cl. ...... 260/849, 117/138.8 F, 260/33.2 R, 260/33.4 UR, 260/850
[51] Int. Cl. ............................................. C08g 37/32
[58] Field of Search.. 260/30.4 N, 32.6 NR, 32.8 N, 260/33.4 UB, 33.6 UB, 849, 850

[56] References Cited
UNITED STATES PATENTS

| | | | |
|---|---|---|---|
| 3,304,273 | 2/1967 | Stamberger | 260/874 |
| 3,759,873 | 9/1973 | Hudak | 260/850 |
| 3,804,810 | 4/1974 | Fryd | 260/30.4 N |

Primary Examiner—Joseph I. Schofer
Assistant Examiner—Paul R. Michl
Attorney, Agent, or Firm—Samuel J. DuBoff; David J. Mugford; Irving Holtzman

[57] ABSTRACT

The coating compositions of the disclosure comprise:
1. A melamine resin of the tri- through hexa-substituted alkoxy ethers of formaldehyde- or acetaldehyde- melamine condensation products;
2. a polyol; and
3. a polyurethane; dissolved in a solvent which will evaporate when a coating of the composition is applied to an article, the weight ratio of the melamine resin to the polyurethane being about 8 to 1 and of the polyol to the polyurethane varying from about 2.5 to 1 to 1 to 1.

Preferably, articles which comprise a substrate formed of a polycarbonate resin are coated with the cured coating composition.

8 Claims, No Drawings

MELAMINE RESIN-POLYOL-POLYURETHANE COATING COMPOSITION AND ARTICLE COATED THEREWITH

BACKGROUND OF THE INVENTION

There has long been a desire to provide suitable glass substitute materials for use in such articles as optical lenses, windows and mirrors, which are the subject of environmental stresses that cause material such as glass to break readily. One of the proposed solutions has been to resort to the use of plastic materials instead of glass to provide good impact strength and also sufficiently good resistance to the action of chemicals, abrasive substances, and other environmental stresses.

Most particularly, the problem of finding a suitable plastic material to substitute for the optical crown glass which is used in fabricating spectacle lenses has been further complicated by the special requirements necessary for fabricating such lenses. In addition to requiring the desirable optical qualities which are found in crown glass, a common problem which must be overcome in most plastic materials, especially thermoplastic materials, is that of providing an abrasion-resistant coating material upon the underlying plastic surface to reduce the tendency for the lens surface to be scratched due to its relatively soft matter.

Among the thermoplastic resins which have been utilized for making articles are the acrylates and methacrylates commonly known as, for example, Plexiglass, Lucite and Crystalite; styrene and vinyl chloride. It has been found to be particularly desirable to make articles from polycarbonate resins which inherently have the good impact strength for use in a number of applications among which is the optical area. However, it is also important to provide to the article made from polycarbonate abrasion resistance and chemical resistance against yellowing which results from exposure to ultra-violet radiation, and to provide resistance to attack by solvents. To provide the requisite properties for an article made of polycarbonate material, it has been found necessary to apply a coating material on the surface of such an article. Although several coating materials have been suggested in the prior art, particularly for articles made of polycarbonate and generally for use on other plastics, these coating materials have been found to be deficient in several areas such as to their stability, degree of protection offered to the underlying substrate, and in their ability to withstand the extreme stress conditions imposed during the fabrication steps of the articles to the desired final shape.

For example, Hausslein et al., U.S. Pat. No. 3,655,432 teaches applying a protective coating material to various articles, the coating material including a biuret compound which is the condensation product of

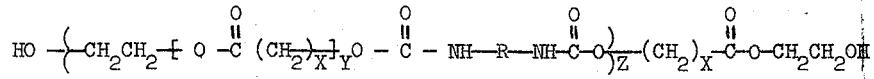

an aliphatic diisocyanate and water, that is reacted with a polyethylene glycol ether. Additional, Ogino in U.S. Pat. No. 3,595,838 discloses a polyurethane coating material obtained by reacting a polyisocyanate with a polyol for use as a coating providing sufficient weathering resistance to the coated article. However, there is no teaching of applicant's coating compositions containing the particular class of polyurethane, polyol and melamine resin which are most effective in withstanding the severe conditions imposed during fabrication of the coated article. Moreover, applicant has found that the addition of a melamine ingredient in the coating formulation provides greatly enhanced abrasion resistance to articles where this is important (e.g. optical lenses).

SUMMARY OF THE INVENTION

The coating compositions disclosed herein overcome the shortcomings found in the prior art with respect to suitable coating compositions which will provide desirable physical properties to the coated article, and will withstand stress conditions imposed during use of the article as well as during fabrication of the article.

The coating composition comprises a melamine resin, a polyol and a polyurethane, said ingredients all being dissolved in a solvent which will evaporate when a coating of the composition is applied to an article, the weight ratio of the melamine resin to the polyurethane being about 8 to 1 and of the polyol to the polyurethane varying from about 2.5 to 1 to 1, wherein:

a. said melamine resin is selected from the group consisting of the tri- through hexa- substituted alkoxy ethers of formaldehyde- and acetaldehyde- melamine condensation products;

b. said polyol is selected from the group consisting of a polyglycol, an ester diol, and an alkyl diol wherein:

1. said poly-glycol is polyethylene- or polypropyleneglycol having a degree of polymerization in the range from about 4 to 44;

2. said ester diol has the formula

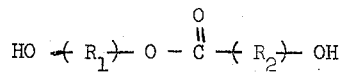

wherein $R_1$ and $R_2$ are each a straight or branched chain saturated aliphatic group containing from 3 to 8 carbon atoms; and 3. said alkyl diol has the formula $$HO-(CH_2)_k-OH$$

wherein K is in the range from 3 to 8; and c. said polyurethane is selected from the group consisting of those compounds having the general formula

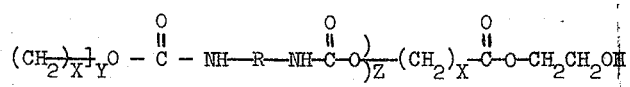

wherein X is about 2 to 12; Y is about 1 to 4; Z is about 1 to 20; and R is selected from the group consisting of

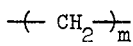

,

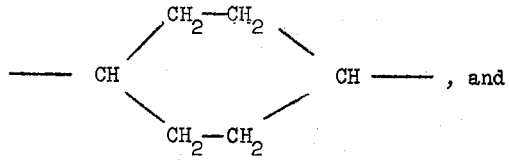

, and

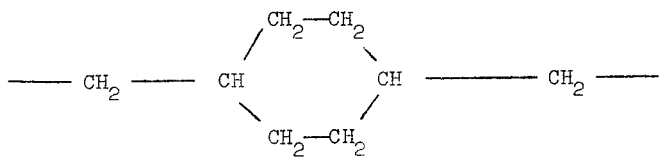

wherein m varies from about 2 to 8.

It has also been found that articles of manufacture, such as ophthalmic quality lenses suitable for use in corrective eyeglass lenses, coated with a coating of the above coating composition, wherein the article substrate is formed of a polycarbonate resin have also greatly enhanced physical properties.

DETAILED DESCRIPTION OF THE INVENTION

The coating composition basically comprises a melamine resin, a polyol and a polyurethane. Additionally, solvents can be added to the composition to provide ease of handling and to control the viscosity of the coating formulation during application to an article. Of course, it is essential that the solvent applied during the normal coating steps will leave the coated product as a residue on the surface of the article to provide a protective coating. In addition, other non-essential additives can be included in the coating composition such as ultra-violet stabilizers (e.g., Cyasorb UV531 sold by American Cyanimid Company).

Solvents for use with the coating compositions above mentioned include the range of solvents which have the ability to provide solvent power for the melamine resin and the polyurethane ingredients in the composition. They are preferably relatively volatile so that they are removed at the curing temperature for the coating material. Useful solvents include aliphatic alcohols, especially the lower alkanols ($C_3$–$C_6$), glycols, glycol ethers or mixtures thereof.

The melamine resins which are useful are those selected from the tri- through hexa- substituted alkoxy ethers of formaldehyde- or acetaldehyde-melamine condensation products. The alkoxy substituent preferably contains from one to four carbon atoms. Where, for example, the formaldehyde-melamine condensation products are desired, these compounds can be easily made by reacting melamine with from 3 to 6 moles of formaldehyde to produce a methylolmelamine having 3 to 6 methylol groups. This product is usually made by condensation at an alkaline pH and has the following formula when, for example, 6 moles of formaldehyde are reacted with one mole of melamine to produce hexamethylolmelamine having the formula:

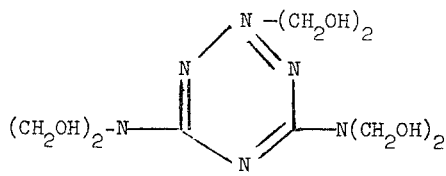

To produce an alkoxy melamine formaldehyde, the particular methylolmelamine compound is reacted with a monohydric alcohol (e.g., methanol, propanol, butanol, isobutanol and higher homologues) at an acid pH. Thus to form hexamethoxymethylmelamine having the formula:

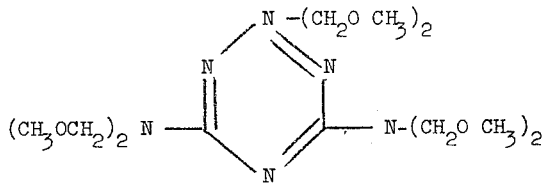

6 moles of methanol are reacted with 1 mole of hexamethylolmelamine. These melamine resins can easily be prepared and some are available commercially such as Rohm and Haas' Uformite MM-83 hexamethoxymethylmelamine resin.

The preferred polyols are selected from these glycols, ester diols, and alkyl diols having 2 chemically reactive hydroxyl sites in the molecule. However, it is understood that polyols having up to about 4 such hydroxyl sites are also contemplated within the scope of the invention.

The useful polyglycols are those which are commonly available and include polypropylene and polyethylene glycols having a degree of polymerization ranging from about 4 to 44. For example, polyethylene glycol having a degree of polymerization of 9 would have the formula:

$$HO + CH_2CH_2O +_9 H,$$

which would have a molecular weight of 414. Higher polyglycols having more than 3 carbon atoms in the basic molecule, as well as polyglycols having a degree of polymerization below about 4 and above about 44 result in coating formulations which do not render adequate abrasion resistance to polycarbonate substrate when applied thereon.

The useful ester diols having the formula:

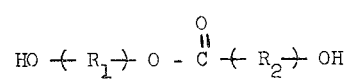

are those wherein $R_1$ and $R_2$ are each a straight or branched chain saturated aliphatic group containing 3 to 8 carbon atoms. Thus $R_1$ and $R_2$ can each be typically, but are not limited to:

$$+ CH_2 +_3$$
$$+ CH_2 +_8$$
$$+ CH_2 +_3 C(CH_3)_2 — CH_2 —$$
$$— CH_2 — C(C_2H_5)_2 — CH_2 — CH_2 —$$
$$— CH_2 — CH_2 — CH(CH_3) — CH_2 —$$

Where there are more than about 8 carbon atoms in either $R_1$ or $R_2$, the resulting ester diol does not crosslink properly with the melamine component, rendering the coating material not sufficiently abrasion resistant. Where there are less than about 3 carbon atoms in either $R_1$ or $R_2$, the coating material containing such a diol tends to chemically attack the polycarbonate substrate, thereby limiting its utility.

The useful alkyl diols are those having the formula:

$$HO-(CH_2)_K-OH,$$

where K is in the range from 3 to 8 for the same reasons discussed above with respect to the $R_1$ and $R_2$ substituents of ester diols.

The polyurethane component is preferably an aliphatic polyurethane which is desirable in view of the good light stability properties rendered to the finally cured coated product. The polyurethane component which is useful is represented by the following formula:

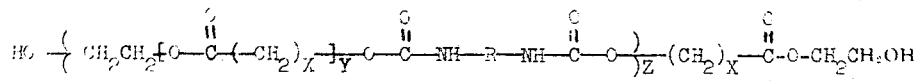

wherein X, Y, Z and R have been previously defined. These polyurethanes can easily be prepared by reacting a polylactone represented by the formula:

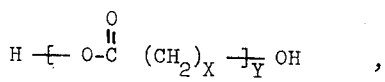

with ethylene oxide to form the corresponding dihydroxy terminated polyester having the formula:

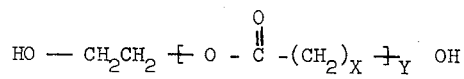

The polylactones are commercially available and can be purchased for example from the Union Carbide Company as its class of compounds called NIAX-polylactone-polyols. The polyester is then reacted with Z moles of a diisocyanate having the formula:

OCN-R-NCO where R is as previously defined, resulting in the final polyurethane ingredient. These polyurethanes can be either easily made as described above or purchased where commercially available, for example from the Baker Castor Oil Company under their Alfa 841 series of polyurethane lacquer.

Generally in the useful polyurethanes, X is not less than 2 because such polylactones are chemically unstable, to applicant's knowledge, thereby preventing the synthesis of the corresponding polyurethanes. Above values where X is about 12, the resulting polyurethane does not provide to the coating material incorporating it sufficient adhesive properties with respect to the polycarbonate to make it useful. Above values where Y is about 4, the coating material containing such polyurethanes causes a hazing effect on the coated polycarbonate surface due to the tendency for such polyurethanes to attack the polycarbonate surface. Also, above values where Z is about 20, there would be difficulty in finding a solvent which could dissolve the polyurethane ingredient for a useful coating material, and yet not attack the polycarbonate substrate. Additionally, where the R substituent, of the polyurethane ingredient, as previously defined, contains more than about 8 carbon atoms, the coating material incorporating this does not have sufficient adhesive properties with respect to the polycarbonate to make it useful. The R substituent is limited at the lower limit to 2 carbon atoms (i.e., where R is $-CH_2-CH_2-$) due to the non-existence of the above-mentioned diisocyanate having less than 2 carbon atoms. It should be noted that R is a saturated aliphatic radical, not containing any point of unsaturation represented by double- and triple-bond carbon linkages.

The ratio of the weights of melamine to polyurethane and polyol to polyurethane are 8 to 1 and 1 – 2.5 to 1, respectively, but small variations can be used, for example up to about 10 percent. The use of different amounts of these three ingredients further removed from the above weight ratios would result in the finally coated article exhibiting defects. At weight ratios of melamine to polyurethane much below 8 to 1, the resulting coating contains an insufficient amount of melamine to provide the level of abrasion resistance desired; at weight ratios much above 8 to 1, the melamine tends to react with itself rather than the polyol resulting in a brittle product that is again inadequate in abrasion resistance. At weight ratios of polyol to polyurethane much above 2.5 to 1 or below 1 to 1, the resulting coating does not adhere to the substrate adequately. In fact, too little polyol or polyurethane relative to melamine in the coating composition results in inadequate adhesion of the cured coating to the substrate.

Also, the amount of reactant solids which includes the melamine resin, polyol and polyurethane in the coating formulation is usually 25 to 50 weight percent of the coating formulation. Below about 25 weight percent, the coating which results is too thin for adequate abrasion resistance. Above about 50 weight percent, the formulation is too viscous and does not apply easily to the article surface.

The coating composition has been found to be most effective as a coating material on substrates formed from a polycarbonate resin. Although polycarbonates can generally be prepared from any dihydric organic compound plus a carbonate diester or equivalent, e.g. dihalide, the optimally useful, i.e. transparent, materials are commercially prepared from a linked, bicyclic, optimally symmetrical, phenylalkylene compound such as 2,2-bis(4-hydroxyphenyl) propane (also called Bisphenol A), plus a dichloride, e.g. phosgene. Commercially available transparent products have the empirical formula:

$$(-COOC_6H_5C(CH_3)_2C_6H_5O-)_x$$

Therefore, any polycarbonate could be used which is transparent, and has a molecular weight, of from about 20,000 to about 35,000 (as determined by light scattering, or birefringence, measurements on a 1 percent solution of the polymer in dioxane at 25°C, in accordance with Zimm, The Journal of Chemistry and Physics, Volume 24, Pages 269, 278 (1956)). The polycarbonates commercially available today are believed to be prepared from bisphenol A and phosgene at molecular weights of from about 23,000 to about 32,000.

The wet coated article can be cured by conventional techniques known to any one skilled in the art. For example, once a wet coating material has been applied to an article it can be air dried at approximately ambient or slightly higher temperatures to evaporate excess solvent. The article can then optionally be passed through a relatively high temperature oven, e.g., an infrared oven, for a short period to begin the curing process and to form a dry coating which is able to retain its shape on the article when it is exposed to moving fluids. The dried coated substrate is next subjected to intermediate temperatures, as in a convection oven, for an extended period, to further cure the coating resin. Typically the coating can be cured by air drying at five minutes, followed by convection oven curing for about 1 to 5 hours at a temperature of at least 250°F. Particularly for coating ophthalmic lenses, the wet coating thickness is about 5 microns or less, and generally ranges from 2 to 4 microns.

To further illustrate the use of the subject coating composition for coating various articles the following description and working examples will be given with respect to fabricating a coated ophthalmic quality lens wherein the lens substrate material is formed of a polycarbonate polymer.

In particular, wherein such lenses are formed of a polycarbonate polymer, the resulting coated lens product exhibits excellent resistance to deformation at ambient temperature, as well as high immunity to discoloration due to aging and weathering, and excellent resiliency and impact strength. The hardness of the surface of this lens is improved by the application of a thin uniform transparent coating of the coating composition disclosed herein on to the optical surface of the polycarbonate lens. Also the cured coating is readily tintable which is important in eyeglass manufacturing. The coating compositions are particularly effective on polycarbonate polymer surfaces in that they provide a hard, abrasion-resistant, thermoset surface which protects the underlying polycarbonate material. To the best of applicant's knowledge, the resulting cured coating consists of a non-reacted polyurethane thermoplastic contained in a matrix of the thermoset reaction product of the melamine resin and the polyol that is used, the polyurethane component providing the necessary bond between the polycarbonate and the harder thermoset reaction product.

Also, as can be seen in the examples and discussion that follows the resulting coating, in addition to providing the desired abrasion resistance for the finished lens product, also permits the use of molding steps involving extreme temperatures and pressure conditions for conversion to the finished lens of an intermediate lens preform containing the cured coating thereon. This can be extremely important in permitting the manufacture of coated articles requiring a high degree of accuracy in dimension and surface conditions, such as is the case in making ophthalmic quality lenses to be used in the optical field.

The polycarbonate lens substrate can be manufactured by a preferred process wherein bulk resin, such as fine, particulate resin, is initially injection molded to form a lens blank having substantially the plan shape and at least the total mass required for the final lens. This lens blank is next heated to an advance temperature at which the polycarbonate resin can be deformed under pressure without cold flow, and then compression molded at the advanced temperature and under advanced pressure to form the final lens product having the proper lens curvature and ophthalmic quality optical properties. During each of the operations and between each operation, it is necessary to insure that the resin and especially the surface of the resin is cleaned, completely dried and free from all foreign materials. The coating can be applied at two points during the procedure. A coating can be applied to the lens blank and the coating and the lens blank formed together into the final optical surface; alternatively, the coating can be applied to the surface of the finally formed optical lens. For a more complete discussion of the procedure, see the currently filed commonly assigned application by Berghahn and Vine entitled "Thermoplastic Ophthalmic Quality Lenses" Ser. No. 362,263.

Whenever the coating is applied to the lens, the same coating procedure and coating materials are utilized. This is possible due to the sufficient resiliency provided by the coating composition of the invention to be able to withstand the deformation of the substrate during the compression molding step. The procedure of Ser. No. 362,263 can be followed precisely merely adding the use of the ultrasonic agitation to the coating bath as a preferred means for applying the coating to the substrate. The use of ultrasonic agitation means in coating baths is more completely described in the currently filed commonly assigned application by Boodman entitled "Ultrasonic Coating Method," Ser. No. 362,264.

The following examples are presented to illustrate the present invention and are only examplary and not limiting of, the scope of the present invention.

In the examples that follow and throughout the disclosure herein the following terms shall have the meaning described below:

A. Uformite MM-83 refers to the registered trademark given to hexamethoxy-methyl-melamine resin solution and made by the Rohm and Haas Company wherein the solution is comprised of 80 weight percent of the melamine resin dissolved in 20 weight percent of a solvent mixture containing equal amounts of Isopropanol and Isobutanol. The formula for hexamethoxymethyl-melamine is a follows:

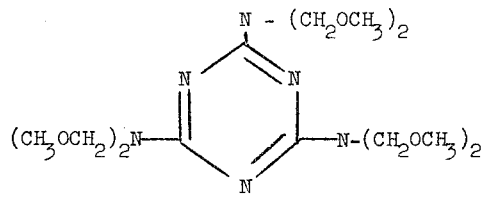

B. Carbowax-400 refers to the registered trademark given to polyethylene glycol having an average molecular weight of 400 which is made by the Union Carbide Company.

C. Alfa-841-M1 refers to the registered trademark given to a proprietary, non-reactive, thermoplastic polyurethane lacquer which does not contain free isocyanate groups made by the Baker Castor Oil Company of Bayonne, New Jersey. This particular lacquer contains 20 weight percent of a polyurethane which is believed to have the formula:

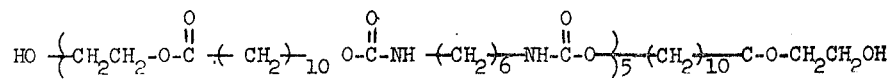

dissolved in 80 weight percent of a solvent mixture comprised of 20 parts by weight of ethanol, 55 parts by weight of isopropanol, and 25 parts by weight of toluene. Also some of the physical properties characterizing this lacquer are as follows:

| | |
|---|---|
| Viscosity - Brookfield RVT at 25°C. | 500 centipoise |
| Specific gravity at 25°C. | 0.888 centipoise |
| Density at 25°C. | 7.4 lbs. per gallon |

D. Esterdiol-204 refers to the chemical made by the Union Carbide Company having the formula:

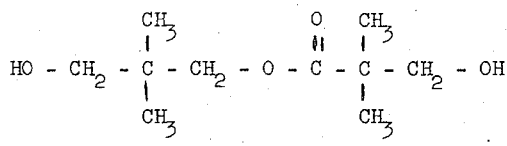

EXAMPLE 1

A sample of particulate polycarbonate resin having a molecular weight range of 27,000 to 32,000 is dried in a hopper, maintained at a temperature of from 250° to 270°F, for about 4 hours, while continuously blowing dried air having a dew point of 40°F. A sample of about 13 gms. of the polycarbonate resin was placed in an injection mold apparatus having a barrel temperature of 435° to 470°F at the rear and, to the front, of 515°F to 540°F; the nozzle was set at 560°F, and an injection pressure of 1,000 to 1,100 psig applied to the resin, to inject the sample in 10 seconds into the mold cavity, maintained at a temperature of 250°F. The resin was held in the mold cavity for 50 seconds before the lens blank was removed. The blank had a center thickness of 0.089 inches, a diameter of 70mm, weighed 13 gms. and had a front curve of +7.50D and an occular surface curve of −8.00/−8.75D. After cooling in a dust-free environment, the lens blank was washed in a hot detergent solution and then rinsed and dried to insure a clean, dust-free, dry surface.

The cleaned and dried lens blank, held by its edge, is immersed into a stainless steel dip tank containing a coating resin solution having a viscosity of 26 cp and comprising:

| | |
|---|---|
| ALFA-841-M1 | 10 parts by weight |
| Iso-Butanol | 10 parts by weight |
| Butyl Cellosolve | 5 parts by weight |
| UFORMITE MM-83 | 20 parts by weight |
| CARBOWAX-400 | 5 parts by weight |

This formulation has a reactant solid (i.e., polyurethane, melamine, polyol) to total coating formulation weight ratio, expressed as a percentage, of 46 percent and the weight ratio with respect to polyurethane of malamine was 8, and of polyol was 2.5. The dip tank measured 5 ⅜ ins. by 9 ⅜ ins. by 6 ins. deep and contained 4.6 quarts of the above coating resin solution. The solution was continuously circulated at a rate of 15–20 gal/hr (in the tank) through a superfine filter capable of removing particles down to about 0.5 microns nominal diameter. The tank bottom was acoustically coupled to a transducer, which was set to produce ultrasonic vibrations at a frequency of about 30,000 cps and at a power output of about 300 watts, total. The lens blank was held in the agitated solution for 10 seconds and then withdrawn vertically at a rate of 3 inches per minute.

The coated lens blank was air dried at ambient conditions for 15 minutes, then passed through an infrared oven for about 2 minutes to evaporate the solvents. The oven is maintained at about 340°F. Finally, the coating resin was cured to the desired hardness at 250°F for 4 hours, in a convection oven. The dried coating had a substantially uniform thickness of about 2–4 microns and was substantially transparent and colorless.

The cured coated lens blank is then placed into a compression molding die, lower half having a normal curve of minus (−) 7.50D with a radius of 3.076 ins. The upper mold die had a normal curve of plus (+) 8.00D/8.50D with radius of 2.884 ins./2.714 ins. The dies were all metal, electroless nickel-plated beryliumcopper, polished to an optical finish. The mold surface was first carefully cleaned.

The two die halves are closed, without permitting either half to contact the lens blank surface. The mold blocks, in which the dies are held, are electrically heated. When the lens blank is at a temperature of 320° to 340°F (after a period of about 150 seconds), pressure of about 600 psi is exerted against the lens blank within the die halves while maintaining the temperature. After about 60 seconds, pressure is increased to 2,000 psi while maintaining the temperature. After an additional about 90 seconds (at 2,000 psi), the lens blank is cooled by cooling water in the mold block while maintaining the pressure on the lens; after about 90 seconds the lens has been cooled to below the glass transition point (about 200°F), at which time the pressure is released and the final coated lens removed.

The coating had an abrasion resistance better than that of CR-39 (diallyl diglycol carbonate), and excellent adhesion to the lens substrate as well as resistance to the solvent action of acetone for greater than 5 minutes. Also, the coated lens tinted readily with both Fasdye blue and RIT dark brown.

EXAMPLE 2

The procedure of Example 1 was repeated and similar results were obtained except that the coating formulation used had a reactant solids to total coating formulation weight ratio, expressed as a percentage, 30.7 percent having a composition as follows:

| | |
|---|---|
| ALFA-841-M1 | 50 parts by weight |
| Iso-Butanol | 50 parts by weight |
| CARBOWAX-400 | 25 parts by weight |
| Butyl Cellosolve | 50 parts by weight |
| UFORMITE MM-83 | 100 parts by weight |
| Isopropanol | 100 parts by weight |

The weight ratio with respect to polyurethane of melamine was 8, of polyol was 2.5.

EXAMPLE 3

The procedure of Example 1 was repeated and similar results were obtained except that the coating formulation used had a reactant solids to total coating formulation weight ratio, expressed as a percentage, of 28.9 percent having a composition as follows:

| | |
|---|---|
| Diacetone Alcohol | 172 parts by weight |
| Methoxy Ethanol | 188 parts by weight |
| CARBOWAX-400 | 98 parts by weight |
| UFORMITE MM-83 | 375 parts by weight |
| ALFA-841-M1 (65%)- Diacetone Alcohol (35%) | 277 parts by weight |
| N-Butanol | 240 parts by weight |
| Butoxyethanol | 125 parts by weight |
| Isopropanol containing 25 drops of Sulfuric Acid | 25 parts by weight |

The weight ratio with respect to polyurethane of melamine was 8.3, and of polyol was 2.7.

EXAMPLE 4

The procedure of Example 1 was repeated and similar results were obtained except that the coating formulation used had a reactant solids to total coating formulation weight ratio, expressed as a percentage, of 33.8 percent having a composition as follows:

| | |
|---|---|
| 25% polyurethane solution* | 8 parts by weight |
| Polyethelene glycol (molecular weight of 400) | 5 parts by weight |
| UFORMITE MM-83 | 20 parts by weight |
| Methoxy Ethanol | 30 parts by weight |
| Butanol with two drops of Sulfuric Acid | 5 parts by weight |

This weight ratio with respect to polyurethane of melamine was 8, and of polyol was 2.5.

Note that the curing of the coated polycarbonate lens preform included a 15 minute air drying period followed by curing for four hours at 264°F. A finished coated lens was made by compression molding the cured coated preform. The coating had excellent adhesion, more than 10 minutes resistance to acetone soaking and abrasion resistance comparable to fully cured diallyl diglycol carbonate (CR-39).

* Preparation of the 25% Polyurethane solution:

24.8 parts by weight of ethylene glycol is heated in a flask equipped for vacuum distillation. When the temperature reaches 150°C, 22.8 parts by weight of epsilon-caprolactone are slowly added. There is a moderate amount of heat released during the addition. The temperature of the solution is maintained at 150°C for 30 minutes after addition. The flask is then cooled and set up for vacuum distillation during which 12.2 parts by weight of distillate are removed. The colorless liquid remaining in the distillation flask is cooled to room temperature after 0.5 parts by weight of dibutyltin-bis (2-ethyl-hexanoate) catalyst is dissolved therein.

32.5 parts by weight of hexamethylene diisocyanate are added with rapid stirring. The mixture is warmed to 50°C and maintained at that temperature for one-half hour. The mixture is then warmed to 85°C and maintained for another one-half hour and then warmed to 100°C and maintained for an additional 2 hours. By that time it has formed a solid offwhite mass.

The resulting polyurethane solid having the formula:

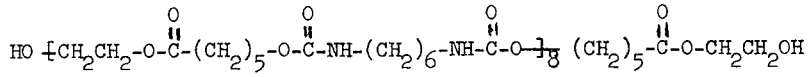

is dissolved with heat in 207 parts by weight of 2-methoxy ethanol to give a 25 percent solution wherein the polyurethane remains soluble at room temperature.

EXAMPLE 5

Following a procedure similar to that described in Example 1, a coating formulation having the following composition was used and similar results were obtained:

| | |
|---|---|
| Esterdiol-204 | 4.76 weight percent |
| Diacetone alcohol | 15.68 weight percent |
| Butanol | 15.67 weight percent |
| Sulfuric acid | 0.40 weight percent |
| UFORMITE MM-83 | 31.75 weight percent |
| ALFA-841-MI | 15.87 weight percent |
| 2-methoxyethanol | 15.87 weight percent |

EXAMPLE 6

The procedure of Example 2 was followed substituting 10 parts by weight of butanediol, having the formula HO—(CH$_2$)$_4$—OH for the 25 parts by weight of CARBOWAX, and similar results were obtained. The weight ratio with respect to polyurethane of butanediol was 1.

EXAMPLE 7

The procedure of Example 2 was followed substituting 20 parts by weight of neopentylglycol, having the formula

HO—CH$_2$—C (CH$_3$)$_2$—CH$_2$—OH for the 25 parts by weight of CARBOWAX, and similar results were obtained. The weight ratio with respect to polyurethane of neopentylglycol was 2.

It is, of course, to be understood that the foregoing examples are intended to be illustrative and that numerous changes can be made in reactant proportions and coatings set forth therein without departing from the spirit of the invention as defined in the appended claims. Particularly, other articles such as toys, fixtures and other articles of manufacture which are made of a substrate formed of a polycarbonate resin can be suitably coated with the herein defined coating composition to provide an effective covering upon the article for subsequent use.

Additionally, the various types of polyurethane materials defined by the general formula previously given can be prepared by anyone skilled in the art and used in the coating composition herein by utilizing the appropriate polyactone and diisocyanate as was previously described above. Furthermore, the various types of polyols, as well as the various melamine resins previously defined and including but not limited to the following:

trimethoxy-methyl-melamine
trimethoxy-butyl-melamine
trimethoxy-ethyl-melamine
triethoxy-methyl-melamine
triethoxy-isobutyl-melamine
tributoxy-methyl-melamine
triisobutoxy-butyl-melamine
hexamethoxy-butyl-melamine
hexabutoxy-methyl-melamine
hexabutoxy-butyl-melamine can be prepared as already described herein or purchased for preparing the useful coating compositions disclosed herein.

Preferred coating compositions are those containing polyurethanes defined by the general formula previously given wherein R is — (CH$_2$)$_m$—, where m varies from about 2 to 8, X varies from about 5 to 10, Y is 1 and Z varies from about 5 to 8. Also preferred are those compositions wherein the polyol is an ester diol, most preferably the diol in which R$_1$ is — CH$_2$—C (CH$_3$)$_2$—CH$_2$— and R$_2$ is —C (CH$_3$)$_2$—CH$_2$—.

What is claimed is:

1. A coating composition comprising a melamine resin, a polyol and a polyurethane, dissolved in a solvent which will evaporate when a coating of said composition is applied to an article, the weight ratio of the

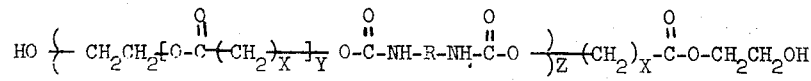

melamine resin to the polyurethane being about 8 to 1, the weight ratio of the polyol to the polyurethane varying from about 2.5 to 1 to 1 to 1, wherein:
  a. said melamine resin is selected from the group consisting of the tri- through hexa- substituted alkoxy ethers of formaldehyde- and acetaldehydemelamine condensation products, wherein the alkoxy substituent contains from 1 to 4 carbon atoms;
  b. said polyol is selected from the group consisting of a polyglycol, an ester diol and an alkyl diol wherein:
    1. said polyglycol is a polyethylene- or polypropylene- glycol having a degree of polymerization in the range of from about 4 to 44;
    2. said ester diol has the formula

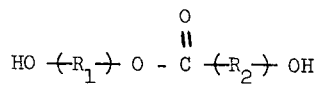

wherein $R_1$ and $R_2$ are each selected from a member of the group of straight or branched chain saturated aliphatics containing from 3 to 8 carbon atoms; and
    3. said alkyl diol has the formula $$HO + CH_2 +_K OH$$

wherein K is in the range from 3 to 8; and
  c. said polyurethane is selected from the group consisting of those compounds having the general formula wherein X is about 2 to 12; Y is about 1 to 4; Z is about 1 to 20; and R is selected from the group consisting of

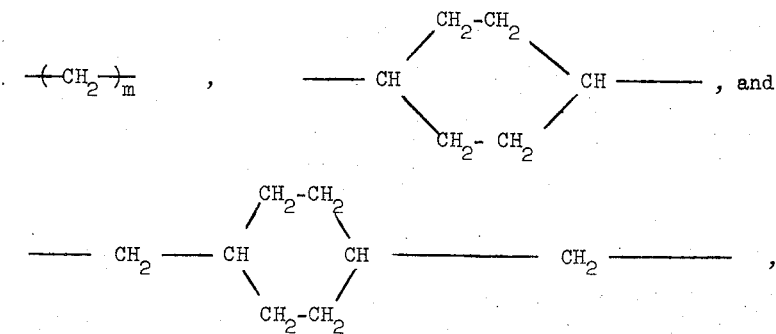

wherein m varies from about 2 to 8.

2. The coating composition of claim 1 wherein R is $-(CH_2)_m-$, said m varying from about 2 to 8; X is about 5 to 10; Y is 1; and Z is about 5 to 8.

3. The coating composition of claim 1 wherein the polyol is said ester diol.

4. The coating composition of claim 3 wherein $R_1$ is $-CH_2-C(CH_3)_2-CH_2-$ and $R_2$ is $-C(CH_3)_2-CH_2-$.

5. An article of manufacture comprising a thermoplastic substrate coated with a cured coating of the coating composition in claim 1, wherein said substrate is formed of a polycarbonate resin.

6. The article claimed in claim 5 wherein said article is an ophthalmic quality lens suitable for use in corrective eyeglass lenses.

7. The article claimed in claim 5 wherein the polycarbonate resin is a polymer formed from a bicyclic symetrical alkylene phenol and a compound selected from the group consisting of carbonate diesters and dihalides.

8. The article claimed in claim 7 wherein the polycarbonate resin is a polymer formed from bisphenol A and phosgene.

* * * * *

UNITED STATES PATENT OFFICE
CERTIFICATE OF CORRECTION

Patent No. 3,862,261         Dated January 21, 1975

Inventor(s) Darrell D. Stoddard

It is certified that error appears in the above-identified patent and that said Letters Patent are hereby corrected as shown below:

Column 2, line 28, after "2.5 to 1" and before "to 1" (second instance), insert -- to 1 --.

Column 9, line 55, delete "malamine" and substitute therefor -- melamine --.

Signed and sealed this 8th day of April 1975.

(SEAL)
Attest:

RUTH C. MASON
Attesting Officer

C. MARSHALL DANN
Commissioner of Patents
and Trademarks